(12) United States Patent
Sasaki et al.

(10) Patent No.: US 11,964,317 B2
(45) Date of Patent: Apr. 23, 2024

(54) HEAT PIPE STRUCTURE AND CAULKING JIG FOR HEAT PIPE STRUCTURE

(71) Applicant: Furukawa Electric Co., Ltd., Tokyo (JP)

(72) Inventors: Chiyoshi Sasaki, Tokyo (JP); Masakazu Isemura, Tokyo (JP); Takahiro Katayama, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 436 days.

(21) Appl. No.: 17/131,423

(22) Filed: Dec. 22, 2020

(65) Prior Publication Data

US 2021/0129206 A1     May 6, 2021

Related U.S. Application Data

(63) Continuation of application No. PCT/JP2019/024128, filed on Jun. 18, 2019.

(30) Foreign Application Priority Data

Jun. 29, 2018  (JP) .................................. 2018-125117

(51) Int. Cl.
*B21D 39/04*  (2006.01)
*F28D 15/02*  (2006.01)

(52) U.S. Cl.
CPC ......... *B21D 39/046* (2013.01); *B21D 39/048* (2013.01); *F28D 15/02* (2013.01)

(58) Field of Classification Search
CPC ............... B23P 15/26; Y10T 29/49353; Y10T 29/49922; B21D 39/046; B21D 39/048; F28D 15/0275
See application file for complete search history.

(56) References Cited

U.S. PATENT DOCUMENTS 298,565 A * 5/1884 Fasternath ............. E06B 3/485
  72/470
1,987,127 A * 1/1935 Rice ........................ H01R 4/16
  439/879

(Continued)

FOREIGN PATENT DOCUMENTS

CN         1827293 A     9/2006
CN      201081589 Y     7/2008

(Continued)

OTHER PUBLICATIONS

[English Translation] Notice of Reasons for Refusal dated Aug. 3, 2022 in Japanese Application No. 2018-125117; pp. all.

(Continued)

*Primary Examiner* — Jason L Vaughan
(74) *Attorney, Agent, or Firm* — Dorsey & Whitney LLP

(57) ABSTRACT

A heat pipe structure includes a base block including a rear surface part thermally connectable to a heat generating body and a heat pipe fixed to a front surface part of the base block and including a heat receiving tubular portion disposed along an in-plane direction of the base block. The base block has a longitudinal direction and a width direction and includes a recessed part in which the heat receiving tubular portion is housed and a pair of wall parts projecting along an outer circumferential surface of the heat receiving tubular portion from width direction both sides of the recessed part, and a container of the heat pipe is caulked and fixed by the recessed part and the pair of wall parts and includes a projecting shape part projecting in a direction opposite to a direction of the caulking between distal end portions of the pair of wall parts.

11 Claims, 4 Drawing Sheets

(56) References Cited

U.S. PATENT DOCUMENTS

| | | | | |
|---|---|---|---|---|
| 2,718,199 | A * | 9/1955 | Curioni | F26B 25/18 |
| | | | | 29/515 |
| 3,051,773 | A * | 8/1962 | Batcheller | H01R 4/185 |
| | | | | 29/521 |
| 3,552,086 | A * | 1/1971 | Allen | E04C 2/365 |
| | | | | 29/513 |
| 5,983,995 | A | 11/1999 | Shutou et al. | |
| 6,330,739 | B1 | 12/2001 | Ito | |
| 9,381,599 | B2 * | 7/2016 | Yang | F28D 15/04 |
| 2003/0005584 | A1 | 1/2003 | Komatsu et al. | |
| 2006/0198150 | A1 | 9/2006 | Kinoshita et al. | |
| 2011/0162206 | A1 | 7/2011 | Chen | |

FOREIGN PATENT DOCUMENTS

| | | |
|---|---|---|
| CN | 102651955 A | 8/2012 |
| CN | 203105032 U | 7/2013 |
| CN | 207519047 U | 6/2018 |
| JP | H1079586 A | 3/1998 |
| JP | H11300436 A | 11/1999 |
| JP | 2000154981 A | 6/2000 |
| JP | 2001248982 A | 9/2001 |
| JP | 2007218439 A | 8/2007 |
| JP | 2009043963 A | 2/2009 |
| JP | 2015227768 A | 12/2015 |
| TW | 201522885 A | 6/2015 |

OTHER PUBLICATIONS

English Translation of International Search Report and Written Opinion for Application No. PCT/JP2019/024128, dated Sep. 10, 2019.

International Preliminary Report on Patentability for PCT Application No. PCT/JP2019/024128, dated Dec. 29, 2020.

[English Translation] Notice of Reasons for Refusal dated Mar. 16, 2022 for Japanese Patent Application No. 2018-125117; pp. all.

Extended European Search Report dated Mar. 7, 2022 for European Patent Application No. 19826171.1; pp. all.

[English Translation] Chinese Office Action dated Dec. 16, 2021 for Chinese Patent Application No. 201980039681.3; pp. all.

\* cited by examiner

HEAT PIPE STRUCTURE AND CAULKING JIG FOR HEAT PIPE STRUCTURE

CROSS REFERENCE TO RELATED APPLICATIONS

The present application is a continuation application of International Patent Application No. PCT/JP2019/024128 filed on Jun. 18, 2019, which claims the benefit of Japanese Patent Application No. 2018-125117, filed on Jun. 29, 2018. The contents of these applications are incorporated herein by reference in their entirety.

BACKGROUND

Technical Field

The present disclosure relates to a heat pipe structure including a heat pipe, which is a heat transport member in which working fluid is encapsulated, and a base block to which the heat pipe is thermally connected and a caulking jig for the heat pipe structure that caulks the heat pipe to thermally connect the heat pipe to the base block.

Background

Conventionally, as a cooling device used for cooling of control equipment or the like in which a semiconductor element is used, there has been known a cooling device that cools a heat generating body using latent heat at the time when a coolant boils. This cooling device includes, for example, a base block thermally connected to the heat generating body and a heat pipe thermally connected to the base block. The heat pipe is a heat transport member. A container of the heat pipe is a sealed container and an inside of the container is subjected to decompression treatment. Working fluid is encapsulated on the inside of the container. The heat pipe transports heat received by the base block from the heat generating body using latent heat due to a phase change of this working fluid.

When the heat pipe is thermally connected to the base block, in order to give thermal connectivity between the base block and the heat pipe and fixing stability of the heat pipe to the base block, it is requested to surely and stably fix the heat pipe to the base block.

Therefore, as a cooling device including a base block and a heat pipe thermally connected to the base block, there has been proposed, for example, a cooling device including a heat pipe, a flat plate-like block made of metal, an attachment groove part formed along a surface direction on one surface side of the flat plate-like block, one end portion of the head pipe disposed in the attachment groove part, and a claw part for fixing, the claw part for fixing being a protruding part relatively formed by recessing a vicinity of the attachment groove part in the flat plate-like block in a thickness direction, and being bent to an inner side of the attachment groove part to be engaged with the one end portion of the heat pipe (Japanese Patent Application Publication No. 2001-248982).

In Japanese Patent Application Publication No. 2001-248982, the heat pipe is fixed to an inside of the attachment groove part by a restraining force in a plate thickness direction of the flat plate-like block by the claw part for fixing. However, in Japanese Patent Application Publication No. 2001-248982, a center part of the caulking jig opposed to the heat pipe is flat. Stress in the flat plate-like block direction is applied over an entire circumferential direction of the heat pipe. An internal space of the heat pipe is subjected to decompression treatment. When pressing in a fixed direction is applied over an entire circumferential direction of a container, since there is no place for escaping from the pressing, buckling or a tear sometimes occurs in the container. If a tear or buckling occurs in the container, airtightness of the container decreases and a function of the heat transport member is deteriorated. If buckling occurs in the container, a restraining force of the claw part for fixing to the container decreases. The heat pipe sometimes cannot be surely and stably fixed to the base block. Further, in Japanese Patent Application Publication No. 2001-248982, a lower side of the heat pipe is fixed to the inside of the attachment groove part and an upper side of the heat pipe is caulked by the claw part for fixing. Therefore, it is difficult to find, from appearance of the heat pipe, the buckling or the tear that occurs in the container.

If there is variation in dimensions of the heat pipe and the base block, even if the heat pipe is caulked by the caulking jig with the same pressing force, variation occurs in presence or absence of the occurrence of buckling or a tear. On the other hand, if the pressing by the caulking jig is loosened in order to prevent buckling or a tear from occurring in the container, a sufficient restraining force of the claw part for fixing cannot be obtained either. The heat pipe cannot be surely and stably fixed to the base block. Eventually, the thermal connectivity between the base block and the heat pipe is sometimes deteriorated.

SUMMARY

In view of the circumstances described above, an object of the present disclosure is to provide a heat pipe structure in which a heat pipe is surely and stably fixed to a base block by obtaining a sufficient restraining force to the heat pipe while preventing a defect such as buckling or a tear from occurring in the heat pipe and to provide a caulking jig for the heat pipe structure.

An aspect of the present disclosure is a heat pipe structure including: a base block including a rear surface part thermally connectable to a heat generating body; and a heat pipe fixed to a front surface part of the base block and including a heat receiving tubular portion disposed along an in-plane direction of the base block, wherein the base block has a longitudinal direction and a width direction and includes a recessed part in which the heat receiving tubular portion is housed and a pair of wall parts projecting along an outer circumferential surface of the heat receiving tubular portion from width direction both sides of the recessed part, and a container of the heat pipe is caulked and fixed by the recessed part and the pair of wall parts and includes a projecting shape part projecting in a direction opposite to a direction of the caulking between distal end portions of the pair of wall parts.

In the aspect of the heat pipe structure, when the heat receiving tubular portion of the heat pipe is caulked and fixed to the recessed part and the pair of wall parts of the base block, the projecting shape part projecting in the direction opposite to the caulking direction is formed in the heat pipe. The projecting shape part formed in the heat pipe is a part formed by a partial region of the container escaping in the direction opposite to the caulking direction at the time of the caulking and fixing.

An aspect of the present disclosure is the heat pipe structure, wherein the pair of wall parts is a pair of ridge parts projecting along the outer circumferential surface of the heat receiving tubular portion and extending along the longitudinal direction of the heat receiving tubular portion, and each of the pair of ridge parts has a press contact surface that comes into press contact with the outer circumferential surface of the heat receiving tubular portion.

An aspect of the present disclosure is the heat pipe structure, wherein an interval between the distal end portions of the pair of wall parts in a part in contact with the container is a dimension equal to or larger than 5% and equal to or smaller than 40% with respect to an entire circumferential length of the container. Note that "an interval between distal end portions" means an interval in a linear distance between a pair of distal end portions.

An aspect of the present disclosure is the heat pipe structure, wherein length in a circumferential direction of the projecting shape part in an orthogonal direction to the longitudinal direction of the container is length equal to or larger than 5% and equal to or smaller than 40% with respect to an entire circumferential length of the container. Note that "length in a circumferential direction of the projecting shape part" means length of an edge portion formed on an outer surface of the projecting shape part.

An aspect of the present disclosure is the heat pipe structure, wherein a shape of the projecting shape part in an orthogonal direction to the longitudinal direction of the container is a shape having a curved part.

An aspect of the present disclosure is the heat pipe structure, wherein a shape of the projecting shape part in an orthogonal direction to the longitudinal direction of the container is an arcuate shape.

An aspect of the present disclosure is a caulking jig for a heat pipe structure that bends a projecting pair of wall parts provided in a base block and caulks the pair of wall parts to a heat receiving tubular portion of a heat pipe to thereby fix the heat pipe to the base plate, the caulking jig for the heat pipe structure including: a pair of caulking parts that becomes contact parts with the pair of wall parts and extends in an inclined state along an outer circumferential surface of the heat pipe; a pair of protruding parts that is provided between the pair of caulking parts, becomes contact parts with distal end portions of the pair of wall parts in a state opposed to the distal end portions, and projects in a caulking direction with respect to the pair of caulking parts; and a hollow shape part that is formed between the pair of protruding parts and hollows in a direction opposite to the caulking direction.

In the aspect of the caulking jig for the heat pipe structure, when a pair of walls is bent to be caulked to the heat receiving tubular portion of the heat pipe, the distal end portions of the pair of wall parts comes into contact with the pair of protruding parts projecting in the caulking direction. Since the caulking jig has the hollow shape part hollowing in the direction opposite to the caulking direction, when the heat receiving tubular portion of the heat pipe is caulked and fixed to the pair of wall parts of the base block, a partial region (a region opposed to the hollow shape part) of the container escapes to the hollow shape part and the projecting shape part projecting in the direction opposite to the caulking direction is formed in the heat pipe.

An aspect of the present disclosure is the caulking jig for the heat pipe structure, wherein an interval between the pair of protruding parts is a dimension equal to or larger than 20% and equal to or smaller than 80% with respect to a total of length of the pair of caulking parts and length of the hollow shape part in an orthogonal direction to the caulking direction. Note that "an interval between the pair of protruding parts" means an interval in a linear distance between the pair of protruding parts.

An aspect of the present disclosure is the caulking jig for the heat pipe structure, wherein a shape of the hollow shape part in an orthogonal direction to the caulking direction is a shape having a curved part.

An aspect of the present disclosure is the caulking jig for the heat pipe structure, wherein a shape of the hollow shape part in an orthogonal direction to the caulking direction is an arcuate shape.

According to the aspect of the heat pipe structure of the present disclosure, the heat pipe structure includes the projecting shape part formed by the partial region of the container escaping in the direction opposite to the caulking direction when the heat receiving tubular portion of the heat pipe is caulked and fixed to the recessed part and the pair of wall parts of the base block. Consequently, it is possible to obtain the heat pipe structure in which a defect such as buckling or a tear is prevented from occurring in the heat pipe and the heat pipe is surely and stably fixed to the base block. Since a defect such as buckling or a tear is prevented from occurring in the heat pipe in the caulking and fixing, it is possible to increase a pressing force in the caulking direction by the caulking jig. Therefore, a sufficient restraining force to the heat pipe is obtained. Adhesion between the base block and the heat pipe is improved. As a result, thermal connectivity between the base block and the heat pipe is improved.

According to the aspect of the heat pipe structure of the present disclosure, the heat pipe structure includes the projecting shape part formed by the partial region of the container escaping in the direction opposite to the caulking direction. Consequently, even if there is variation in dimensions of the heat pipe and the base block, a defect such as buckling or a tear is prevented from occurring in the heat pipe.

According to the aspect of the heat pipe structure of the present disclosure, the interval between the distal end portions of the pair of wall parts in a part in contact with the container is the dimension equal to or larger than 5% and equal to or smaller than 40% with respect to the entire circumferential length of the container. Consequently, a defect such as buckling or a tear is more surely prevented from occurring in the heat pipe.

According to the aspect of the heat pipe structure of the present disclosure, the length in the circumferential direction of the projecting shape part in the orthogonal direction to the longitudinal direction of the container is the length equal to or larger than 5% and equal to or smaller than 40% with respect to the entire circumferential length of the container. Consequently, a defect such as buckling or a tear is more surely prevented from occurring in the heat pipe.

According to the aspect of the caulking jig for the heat pipe structure of the present disclosure, when the heat receiving tubular portion of the heat pipe is caulked and fixed to the pair of wall parts of the base block using the caulking jig for the heat pipe structure, the partial region of the container escapes to the hollow shape part of the caulking jig for the heat pipe structure to form, in the heat pipe, the projecting shape part projecting in the direction opposite to the caulking direction (the pressing direction of the caulking jig). Since the partial region of the container escapes to the hollow shape part to form the projecting shape part in the heat pipe, it is possible to prevent a defect such as buckling or a tear from occurring in the heat pipe and it is possible to surely and stably fix the heat pipe to the base block. Since it is possible to prevent a defect such as buckling or a tear from occurring in the heat pipe in the caulking and fixing, it is possible to increase the pressing force in the caulking direction. Therefore, a sufficient restraining force to the heat pipe is obtained. It is possible to improve the adhesion between the base block and the heat pipe. As a result, it is possible to improve the thermal connectivity between the base block and the heat pipe.

According to the aspect of the caulking jig for the heat pipe structure of the present disclosure, the partial region of the container escapes to the hollow shape part to form the projecting shape part in the heat pipe. Consequently, even if there is variation in the dimensions of the heat pipe and the base block, it is possible to prevent a defect such as buckling or a tear from occurring in the heat pipe.

According to the aspect of the caulking jig for the heat pipe structure of the present disclosure, the interval between the pair of protruding parts is the dimension equal to or larger than 20% and equal to or smaller than 80% with respect to the total of the length of the pair of caulking parts and the length of the hollow shape parts in the orthogonal direction with respect to the caulking direction. Consequently, it is possible to more surely prevent a defect such as buckling or a tear from occurrent in the heat pipe.

DETAILED DESCRIPTION

Figure 1:
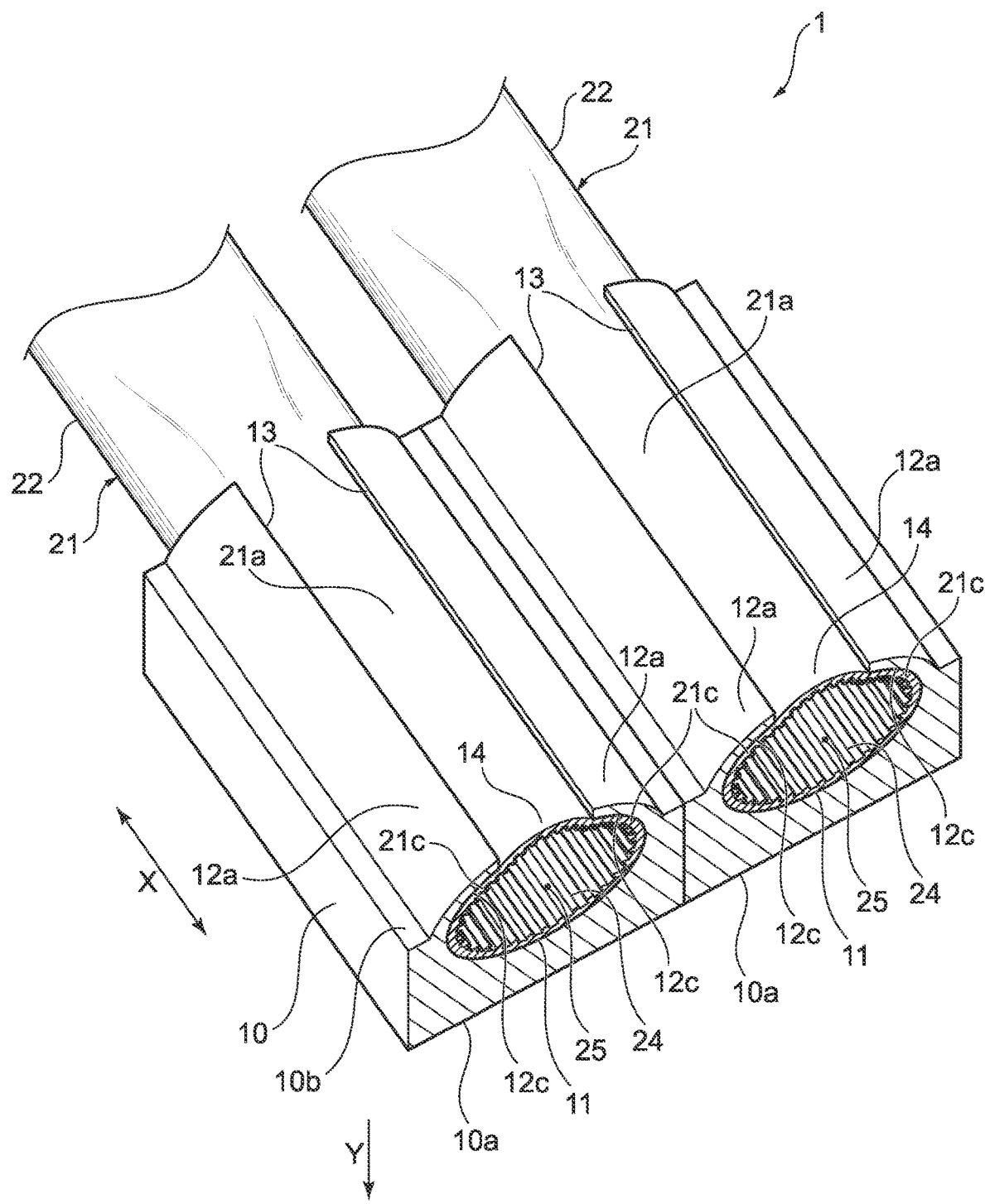
FIG. 1 An explanatory view schematically showing a cross section of a heat pipe structure according to an embodiment example of the present disclosure.
Figure 2:
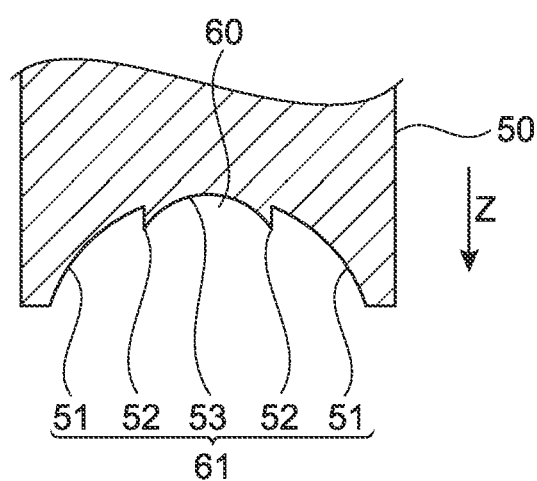
FIG. 2 An explanatory view of a cross section of a caulking jig for the heat pipe structure according to the embodiment example of the present disclosure.

Hereinafter, a heat pipe structure and a caulking jig for the heat pipe structure according to an embodiment example of the present disclosure is explained with reference to the drawings. FIG. 1 is an explanatory view schematically showing a cross section of the heat pipe structure according to the embodiment example of the present disclosure. FIG. 2 is an explanatory view of a cross section of the caulking jig for the heat pipe structure according to the embodiment example of the present disclosure. FIGS. 3A-3D are explanatory views schematically showing a cross section at the time when the heat pipe structure is manufactured using the caulking jig for the heat pipe structure according to the embodiment example of the present disclosure; a FIG. 3A figure is an explanatory view before a caulking process start, a FIG. 3B figure is an explanatory view in the beginning of the caulking process start, a FIG. 3C figure is an explanatory view of a latter half of the caulking process, and a FIG. 3D figure is an explanatory view after the caulking process. FIG. 4 is an explanatory view of a use method example of the heat pipe structure according to the embodiment example of the present disclosure.

First, the heat pipe structure according to the embodiment example of the present disclosure is explained.

As shown in FIG. 1, a heat pipe structure 1 includes a base block 10 including a rear surface part 10a thermally connectable to a heat generating body (not illustrated) and a front surface part 10b opposed to the rear surface part 10a and a heat pipe 21 fixed to the front surface part 10b of the base block 10 and including a heat receiving tubular portion 21a disposed along an in-plane direction of the base block 10.

The base block 10 has a longitudinal direction and a width direction. A shape of the base block 10 is not particularly limited. However, in the heat pipe structure 1, the shape of the base block 10 is a plate-like shape having predetermined thickness. A shape in a plan view of the base block 10 is a rectangular shape. The rear surface part 10a and the front surface part 10b are main surfaces of the base block 10. Note that "plan view" means a state visually recognized from an orthogonal direction with respect to a heat transport direction of the heat pipe 21 and from a direction opposed to the front surface part 10b.

The front surface part 10b of the base block 10 includes a recessed part 11 in which the heat receiving tubular portion 21a is housed and a pair of wall parts 12a, 12a projecting along an outer circumferential surface of the heat receiving tubular portion 21a from width direction both sides of the recessed part 11. The heat receiving tubular portion 21a of the heat pipe 21 is caulked and fixed to the recessed part 11 and the pair of wall parts 12a, 12a.

The recessed part 11 extends, for example, in the longitudinal direction of the base block 10 along the in-plane direction of the base block 10. A shape in an orthogonal direction to the longitudinal direction of the recessed part 11 (hereinafter sometimes referred to as "width direction") corresponds to a shape of a substantially lower half of a shape in the width direction of the heat pipe 21.

The pair of wall parts 12a, 12a is provided along the in-plane direction of the base block 10 like the recessed part 11. The wall part 12a extends, for example, along the extending direction of the recessed part 11 and extends in parallel to the extending direction of the recessed part 11. In a width direction cross section, the pair of wall parts 12a, 12a projects toward above the recessed part 11 and is bent toward a width direction center of the recessed part 11 to come close to each other. It is preferable that the pair of wall parts 12a, 12a is a pair of ridge parts projecting along an outer circumferential surface 21c of the heat receiving tubular portion 21a opposed to the pair of wall parts 12a, 12a and extending along the longitudinal direction of the heat receiving tubular portion 21a (an X direction in the figure). At this time, each of the pair of ridge parts includes a press contact surface 12c that is in press contact with the outer circumferential surface 21c of the heat receiving tubular portion 21a opposed to the pair of ridge parts. Since the pair of ridge parts includes a pair of press contact surfaces 12c, 12c, a contact area of the pair of ridge parts and the heat receiving tubular portion 21a increases and adhesion between the base block 10 and the heat pipe 21 is improved.

The heat pipe 21 includes a tube-shaped container 22, an end face at one end and an end face at another end of which are sealed, a wick structure 24 provided on an inside of the container 22, and working fluid encapsulated in a cavity part 25, which is an internal space of the container 22. The cavity part 25 of the container 22 is a sealed space and is subjected to decompression treatment. A material of the container 22 is not particularly limited. Examples of the material include copper, a copper alloy, aluminum, an aluminum alloy, and stainless steel. The working fluid can be selected as appropriate according to compatibility with the material of the container 22. Examples of the working fluid include water, alternative freon, perfluorocarbon, and cyclopentane. The wick structure 24 is not particularly limited if the wick structure 24 is a structure that generates capillarity. Examples of the wick structure 24 include a plurality of fine grooves (grooves) extending along the longitudinal direction of the container 22, a sintered body of metal powder, and a metal mesh. Note that, in FIG. 1, the grooves are used from a viewpoint of preventing an increase in circular current resistance of the working fluid in a liquid phase.

As shown in FIG. 1, a width direction cross section of the container 22 in the heat receiving tubular portion 21a is a substantially circular shape. In the width direction cross section, the container 22 in the heat receiving tubular portion 21a includes a projecting shape part 14 projecting in a direction opposite to a caulking direction (a Y direction in the figure) between distal end portions 13, 13 of the pair of wall parts 12a, 12a. The projecting shape part 14 projects in a direction opposite to the recessed part 11. In the width direction cross section of the container 22, a curvature of the container 22 changes across a position of the distal end portion 13. The projecting shape part 14 is a part formed by a region between the distal end portions 13, 13 of the pair of wall parts 12a, 12a in the container 22 escaping in a direction opposite to the caulking direction when the heat receiving tubular portion 21a is caulked and fixed to the recessed part 11 and the pair of wall parts 12a, 12a of the base block 10.

In the heat pipe structure 1, a shape of the projecting shape part 14 in the width direction cross section of the container 22 is a shape having a curved part. More specifically, the shape of the projecting shape part 14 in the width direction cross section of the container 22 is an arcuate shape. The curvature of the container 22 of the projecting shape part 14 is a form larger than the curvature of the container 22 on the outer circumferential surface 21c of the heat receiving tubular portion 21a opposed to and brought into press contact with the pair of wall parts 12a, 12a.

The container 22 in the heat receiving tubular portion 21a includes the projecting shape part 14 formed by the region between the distal end portions 13, 13 of the pair of wall parts 12a, 12a in the container 22 escaping in the direction opposite to the caulking direction. Consequently, it is possible to obtain the heat pipe structure 1 in which a defect such as buckling or a tear is prevented from occurring in the heat receiving tubular portion 21a and the heat receiving tubular portion 21a is surely and stably fixed to the base block 10. Since a defect such as buckling or a tear is prevented from occurring in the heat receiving tubular portion 21a in the caulking and fixing, it is possible to increase a pressing force in the caulking direction by the caulking jig. Therefore, a sufficient restraining force to the heat pipe 21 is obtained. Adhesion between the base block 10 and the heat receiving tubular portion 21a is improved. As a result, thermal connectivity between the base block 10 and the heat pipe 21 is improved.

The container 22 in the heat receiving tubular portion 21a includes the projecting shape part 14 formed by the region between the distal end portions 13, 13 of the pair of wall parts 12a, 12a in the container 22 escaping in the direction opposite to the caulking direction. Consequently, even if there is variation in dimensions of the heat receiving tubular portion 21a and the pair of wall parts 12a, 12a, a defect such as buckling or a tear is prevented from occurring in the heat receiving tubular portion 21a.

An interval between the distal end portions 13 of the pair of wall parts 12a, 12a in a part in contact with the outer circumferential surface of the container 22 is not particularly limited. However, from a viewpoint that a defect such as buckling or a tear is more surely prevented from occurring in the heat receiving tubular portion 21a, a dimension equal to or larger than 5% and equal to or smaller than 40% with respect to an entire circumferential length in the width direction cross section of the container 22 is preferable. A dimension equal to or larger than 10% and equal to or smaller than 20% with respect to the entire circumferential length is particularly preferable.

Length in the circumferential direction of the projecting shape part 14 in the width direction cross section of the container 22 is not particularly limited. However, from a viewpoint that a defect such as buckling or a tear is more surely prevented from occurring in the heat receiving tubular portion 21a, length equal to or larger than 5% and equal to or smaller than 40% with respect to the entire circumferential length in the width direction cross section of the container 22 is preferable. Length equal to or larger than 10% and equal to or smaller than 20% of the entire circumferential length is particularly preferable.

Thereafter, a caulking jig for a heat pipe structure and a manufacturing method for the heat pipe structure using the caulking jig for the heat pipe structure according to an embodiment example of the present disclosure are explained.

As shown in FIG. 2 and FIGS. 3A-3D, a caulking jig 50 for a heat pipe structure according to the embodiment example of the present disclosure is a jig that bends the projecting pair of wall parts 12a, 12a provided in the base block 10 and caulks the pair of wall parts 12a, 12a to the heat receiving tubular portion 21a of the heat pipe 21 to thereby fix the heat pipe 21 to the base plate 10. The caulking jig 50 for the heat pipe structure is a jig including a substantially reverse-U-shaped groove part 61 in a bottom surface part 60. The caulking jig 50 for the heat pipe structure is moved downward in a vertical direction (an arrow Z direction in FIGS. 2 and 3A-3D) and the groove part 61 is pressed against the pair of wall parts 12a, 12a to press both of the pair of wall parts 12a, 12a.

The groove part 61 of the caulking jig 50 for the heat pipe structure includes a pair of caulking parts 51, 51, a pair of protruding parts 52, 52 provided between the pair of caulking parts 51, 51 and provided further on a width direction inner side of the groove part 61 than the pair of caulking parts 51, 51, and a hollow shape part 53 formed between the pair of protruding parts 52, 52. From the above description, the pair of protruding parts 52, 52 is respectively disposed between the pair of caulking parts 51, 51 and the hollow shape part 53.

The pair of caulking parts 51, 51 extends in a state inclined along an outer circumferential surface of the heat pipe 21. The pair of caulking parts 51, 51 is contact parts with the pair of wall parts 12a, 12a. By pressing the pair of caulking parts 51, 51 against the pair of wall parts 12a, 12a and moving the caulking jig 50 for the heat pipe structure downward in the vertical direction, a press contact surface 12c in press contact with the outer circumferential surface 21c of the heat receiving tubular portion 21a opposed to the pair of wall parts 12a, 12a is formed in each of the pair of wall parts 12a, 12a. Note that, in FIGS. 2 and 3, a shape of the pair of caulking parts 51, 51 in the width direction of the groove part 61 is an elliptical arc shape.

The pair of protruding parts 52, 52 is protrusions projecting downward in the vertical direction, which is the caulking direction, with respect to the pair of caulking parts 51, 51. The pair of protruding parts 52, 52 is formed in positions opposed to the distal end portions 13, 13 of the pair of wall parts 12a, 12a during a caulking process. The pair of protruding parts 52, 52 is parts that the distal end portions 13, 13 come into contact when the press contact surface 12c on which the pair of wall parts 12a, 12a comes into press contact with the outer circumferential surface 21c of the heat receiving tubular portion 21a is formed by moving the caulking jig 50 for the heat pipe structure downward in the vertical direction. Therefore, height of the pair of protruding parts 52, 52 is almost the same degree as thickness of the pair of wall parts 12a, 12a. Note that, in FIGS. 2 and 3A-3D, distal end portions of the pair of protruding parts 52, 52 respectively face directions of the pair of caulking parts 51, 51 provided on a width direction outer side of the groove part 61.

The hollow shape part 53 is a part hollowed in a direction opposite to the caulking direction (the arrow Z direction in FIGS. 2 and 3A-3D). A shape of the hollow shape part 53 in the width direction of the groove part 61 is not particularly limited. However, in FIG. 2, the shape of the hollow shape part 53 is a shape having a curved part. More specifically, the shape of the hollow shape part 53 in the width direction of the groove part 61 is an arcuate shape. A curvature of the hollow shape part 53 is a form larger than a curvature of the pair of caulking parts 51, 51. The caulking jig 50 for the heat pipe structure includes the hollow shape part 53 hollowed in the direction opposite to the caulking direction. Consequently, during the caulking process, a part 21d opposed to the hollow shape part 53 of the heat receiving tubular portion 21a escapes in the direction opposite to the caulking direction and the projecting shape part 14 is formed (see FIG. 1 and FIG. 3D). Therefore, the projecting shape part 14 of the heat receiving tubular portion 21a has a shape corresponding to the shape of the hollow shape part 53.

Since the caulking jig 50 for the heat pipe structure includes the hollow shape part 53, the part 21d opposed to the hollow shape part 53 of the heat receiving tubular portion 21a can escape in the direction opposite to the caulking direction during the caulking process. Therefore, it is possible to prevent a defect such as buckling or a tear from occurring in the heat receiving tubular portion 21a. It is possible to surely and stably fix the heat receiving tubular portion 21a to the base block 10. In the caulking and fixing, since it is possible to prevent a defect such as buckling or a tear in the heat receiving tubular portion 21a, it is possible to increase a pressing force in the caulking direction by the caulking jig 50 for the heat pipe structure. Therefore, a sufficient restraining force to the heat pipe 21 is obtained. It is possible to improve the adhesion between the base block 10 and the heat receiving tubular portion 21a. As a result, the thermal connectivity between the base block 10 and the heat pipe 21 is improved.

Since the caulking jig 50 for the heat pipe structure includes the hollow shape part 53, even if there is variation in the dimensions of the heat receiving tubular portion 21a and the pair of wall parts 12a, 12a, it is possible to prevent a defect such as buckling or a tear from occurring in the heat receiving tubular portion 21a.

An interval between the pair of protruding parts 52, 52 with respect to a total of length of the pair of caulking parts 51, 51 and length of the hollow shape part 53 in an orthogonal direction to the caulking direction is not particularly limited. However, from a viewpoint that it is possible to more surely prevent a defect such buckling or a tear from occurring in the heat pipe 21, a dimension equal to or larger than 20% and equal to or smaller than 80% with respect to the total of the lengths is preferable and a dimension equal to or larger than 50% and equal to or smaller than 70% with respect to the total of the lengths is particularly preferable.

Thereafter, a manufacturing method for the heat pipe structure 1 using the caulking jig 50 for the heat pipe structure is explained.

First, as shown in FIG. 3A, the heat pipe 21 is fit and inserted into the recessed part 11 of the base block 10. The groove part 61 of the caulking jig 50 for the heat pipe structure is brought into contact with the pair of wall parts 12a, 12a. At this time, the pair of wall parts 12a, 12a are brought into contact in parts of the pair of caulking parts 51, 51. The pair of protruding parts 52, 52 are located to be opposed to the distal end portions 13, 13 of the pair of wall parts 12a, 12a via a predetermined gap.

Thereafter, as shown in FIG. 3B, the caulking jig 50 for the heat pipe structure is moved downward in the vertical direction. At this time, the outer circumferential surface 21c of the heat receiving tubular portion 21a in contact with the pair of wall parts 12a, 12a receives stress on the width direction outer side. The pair of wall parts 12a, 12a is brought into press contact with the outer circumferential surface 21c of the heat receiving tubular portion 21a. When the pair of wall parts 12a, 12a is brought into press contact with the outer circumferential surface 21c of the heat receiving tubular portion 21a, the gap formed between the pair of protruding parts 52, 52 and the distal end portions 13, 13 of the pair of wall parts 12a, 12a becomes narrower. As the outer circumferential surface 21c of the heat receiving tubular portion 21a in contact with the pair of wall parts 12a, 12a receives the stress on the width direction outer side, the part 21d opposed to the hollow shape part 53 of the heat receiving tubular portion 21a receives stress upward in the vertical direction.

When the caulking jig 50 for the heat pipe structure is further moved downward in the vertical direction, as shown in FIG. 3C, the press contact surface 12c on which the pair of wall parts 12a, 12a is in press contact with the outer circumferential surface 21c of the heat receiving tubular portion 21a is formed. Accordingly, the part 21d opposed to the hollow shape part 53 of the heat receiving tubular portion 21a escapes to the hollow shape part 53 located upward in the vertical direction. The distal end portions 13, 13 of the pair of wall parts 12a, 12a come into contact with the pair of protruding parts 52, 52. Therefore, the distal end portions 13, 13 of the pair of wall parts 12a, 12a are prevented from extending further to the width direction inner side (that is, the hollow shape part 53) than the pair of protruding parts 52, 52.

Figure 3:
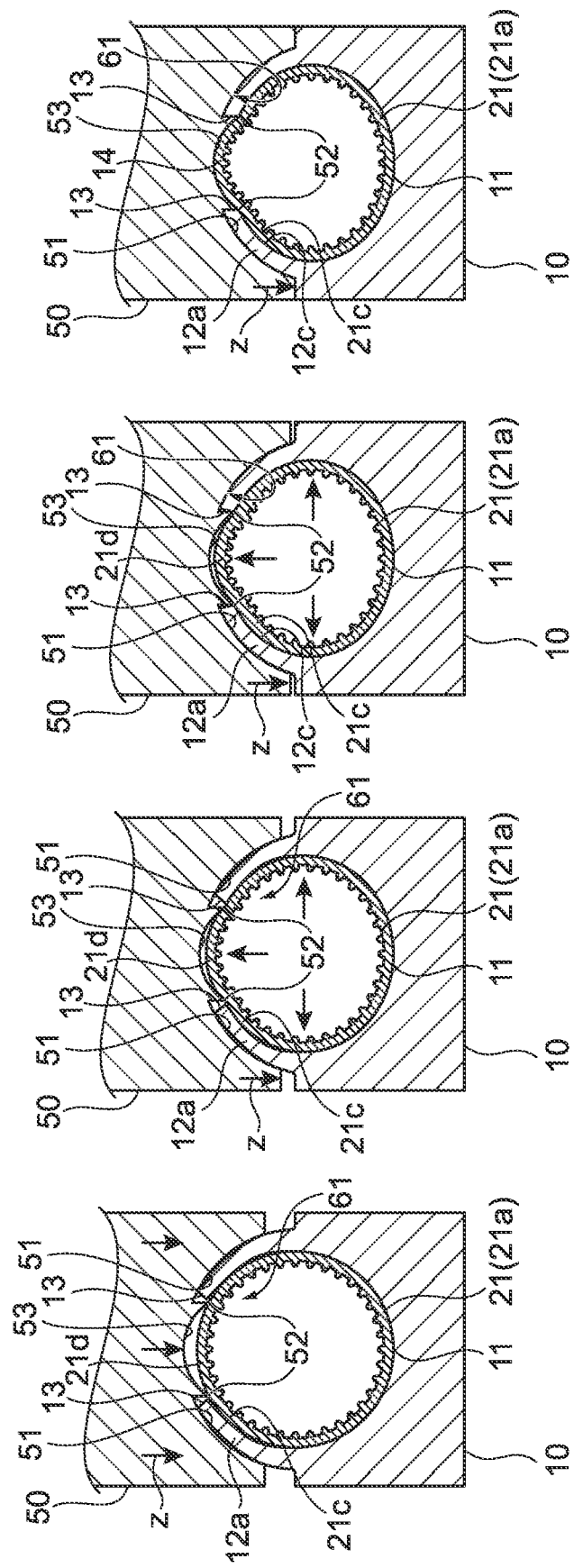
FIG. 3A, FIG. 3B, FIG. 3C and FIG. 3D Explanatory views schematically showing a cross section at the time when the heat pipe structure is manufactured using the caulking jig for the heat pipe structure according to the embodiment example of the present disclosure; a FIG. 3A figure is an explanatory view before a caulking process start, a FIG. 3B figure is an explanatory view in the beginning of the caulking process start, a FIG. 3C figure is an explanatory view of a latter half of the caulking process, and a FIG. 3D figure is an explanatory view after the caulking process.
Figure 4:
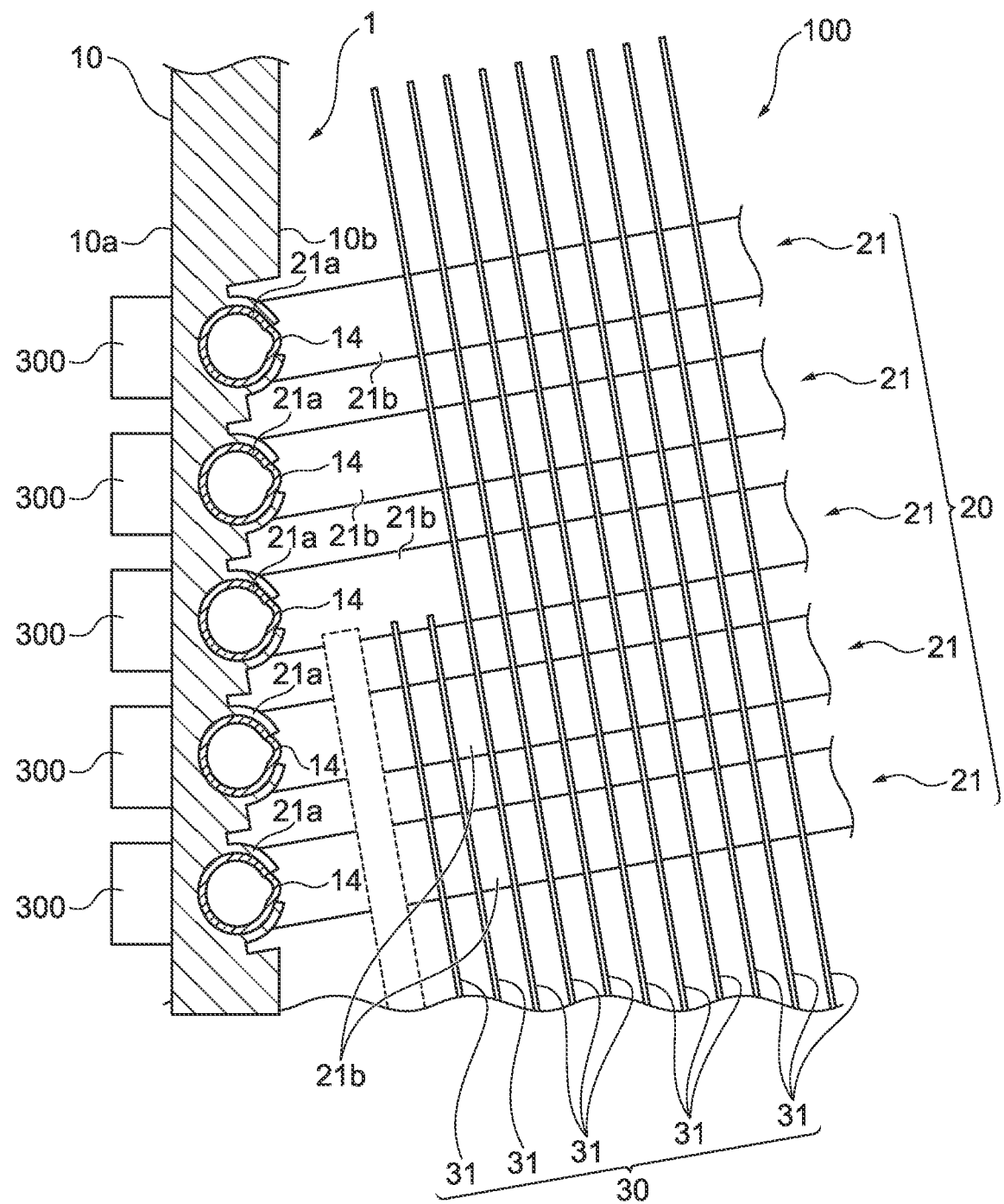
FIG. 4 An explanatory view of a use method example of the heat pipe structure according to the embodiment example of the present disclosure.

When the caulking process ends, as shown in FIG. 3 D, in a state in which the projecting shape part 14 is formed in the heat receiving tubular portion 21a, the heat receiving tubular portion 21a is caulked and fixed to the recessed part 11 and the pair of wall parts 12a, 12a of the base block 10. The heat pipe structure 1 can be manufactured.

Thereafter, a using method example of the heat pipe structure of the present disclosure is explained. The heat pipe structure of the present disclosure can be used as a cooling device that cools electric and electronic components and the like. In the heat pipe structure of the present disclosure, according to necessity, heat exchanging means (for example, a fin) is thermally connected to a part other than the heat receiving tubular portion of the heat pipe to form a heat sink.

Hereinafter, an example of a case in which the heat pipe structure 1 according to the embodiment example of the present disclosure is used in a mobile body (for example, a railroad) as a cooling device in a form of a heat sink is explained. As shown in FIG. 4, a heat sink 100 includes the heat pipe structure 1 according to the embodiment example including the base block 10 including the rear surface part 10a thermally connected to an electric component 300, which is a heat generating body of a cooling target, the heat receiving tubular portion 21a of the heat pipe 21 fixed to the front surface part 10b of the base block 10 and disposed along an in-plane direction of the base block 10, and a hear radiating tubular portion 21b of the heat pipe 21 connected to and communicating with the heat receiving tubular portion 21a and erected from the base block 10. In the heat sink 100, a plurality of the heat pipes 21 are configured to form a heat pipe group 20. The heat sink 100 includes a fin group 30 configured by a plurality of fins 31, 31, . . . arranged in an erecting direction of the heat pipe group 20, that is, in parallel in an extending direction of the hear radiating tubular portion 21b and fixed to the hear radiating tubular portion 21b.

The plurality of heat pipes 21, 21, forming the heat pipe group 20 are provided to be arranged at an interval in an up-down direction and, for example, provided in parallel in the vertical direction. A shape in the longitudinal direction (the heat transport direction) of the heat pipe 21 is not particularly limited, for example, a linear shape or a shape having a curved part. However, for example, in FIG. 4, the heat pipe 21 is configured by a tubular body having a U shape.

The heat receiving tubular portion 21a has a function of a heat receiving part heated by heat from the base block 10. A shape in the longitudinal direction of the heat receiving tubular portion 21a is a linear shape. The hear radiating tubular portion 21b has a function of a heat radiating part that emits heat from the heat receiving tubular portion 21a. A shape in the longitudinal direction of the hear radiating tubular portion 21b is a linear shape.

The plurality of fins 31, 31, . . . forming the fin group 30 are provided in parallel at a predetermined interval in an extending direction of the hear radiating tubular portion 21b. For example, in the heat sink 100, principal planes of the plurality of fins 31, 31, . . . are provided in parallel to be substantially parallel. The fin 31 includes one or a plurality of hole parts corresponding to a position, a shape, and a dimension of the hear radiating tubular portion 21b of the heat pipe 21. The fin 31 is fixed to the heat pipe 21 by, for example, fitting and inserting the hear radiating tubular portion 21b into this hole part. The fin 31 has a function of heat exchanging means for emitting heat from the hear radiating tubular portion 21b.

When the base block 10 of the heat sink 100 receives heat from the electric component 300, which is the heat generating body, in the rear surface part 10a, the heat is transferred from the rear surface part 10a to the front surface part 10b of the base block 10. The heat transferred to the front surface part 10b is further transferred from the front surface part 10b to the heat receiving tubular portion 21a of the heat pipe 21. When the heat is transferred to the heat receiving tubular portion 21a, the heat receiving tubular portion 21a functions as a heat receiving part (an evaporating part) of the heat pipe 21. Working fluid inside the heat pipe 21 changes from a liquid phase to a gas phase in the heat receiving part. When the working fluid changed to the gas phase flows inside the heat pipe 21 in the longitudinal direction of the heat pipe 21 from the heat receiving part to a heat radiating part (a condensing part) of the heat receiving tubular portion 21b, the heat from the electric component 300, which is the heat generating body, is transported from the heat receiving part to the heat radiating part of the heat pipe 21. The heat transported from the heat receiving part to the heat radiating part of the heat pipe 21 is emitted as latent heat when the working fluid in the gas phase changes to the liquid phase in the heat radiating part of the hear radiating tubular portion 21b in which the fin 31, which is the heat exchanging means, is provided.

What is claimed is:

1. A heat pipe structure comprising:
   a base block including a rear surface part thermally connectable to a heat generating body; and
   a heat pipe fixed to a front surface part of the base block and including a heat receiving tubular portion disposed along an in-plane direction of the base block, wherein
   the base block has a longitudinal direction and a width direction and includes a recessed part in which the heat receiving tubular portion is housed and a pair of wall parts projecting along an outer circumferential surface of the heat receiving tubular portion from width direction both sides of the recessed part,
   a container of the heat pipe is caulked and fixed by the recessed part and the pair of wall parts and includes a projecting shape part projecting in a direction opposite to a direction of the caulking between distal end portions of the pair of wall parts,
   the projecting shape part of the heat receiving tubular portion has a shape corresponding to a shape of a hollow shape part of a caulking jig,
   the shape of the hollow shape part of the caulking jig has a curvature, and
   a length in a circumferential direction of the projecting shape part in an orthogonal direction to the longitudinal direction of the container is equal to or larger than 5% and equal to or smaller than 40% with respect to an entire circumferential length of the container.

2. The heat pipe structure according to claim 1, wherein the pair of wall parts is a pair of ridge parts projecting along the outer circumferential surface of the heat receiving tubular portion and extending along the longitudinal direction of the heat receiving tubular portion, and
   each of the pair of ridge parts has a press contact surface that comes into press contact with the outer circumferential surface of the heat receiving tubular portion.

3. The heat pipe structure according to claim 2, wherein an interval between the distal end portions of the pair of wall parts in a part in contact with the container is a dimension equal to or larger than 5% and equal to or smaller than 40% with respect to an entire circumferential length of the container.

4. The heat pipe structure according to claim 2, wherein a shape of the projecting shape part of the heat receiving tubular portion in the orthogonal direction to the longitudinal direction of the container is a shape having a curved part.

5. The heat pipe structure according to claim 2, wherein a shape of the projecting shape part of the heat receiving tubular portion in the orthogonal direction to the longitudinal direction of the container is an arcuate shape.

6. The heat pipe structure according to claim 1, wherein an interval between the distal end portions of the pair of wall parts in a part in contact with the container is a dimension equal to or larger than 5% and equal to or smaller than 40% with respect to an entire circumferential length of the container.

7. The heat pipe structure according to claim 6, wherein a shape of the projecting shape part of the heat receiving tubular portion in the orthogonal direction to the longitudinal direction of the container is a shape having a curved part.

8. The heat pipe structure according to claim 6, wherein a shape of the projecting shape part of the heat receiving tubular portion in the orthogonal direction to the longitudinal direction of the container is an arcuate shape.

9. The heat pipe structure according to claim 1, wherein the shape of the projecting shape part of the heat receiving tubular portion in the orthogonal direction to the longitudinal direction of the container is a shape having a curved part.

10. The heat pipe structure according to claim 9, wherein a shape of the projecting shape part of the heat receiving tubular portion in the orthogonal direction to the longitudinal direction of the container is an arcuate shape.

11. The heat pipe structure according to claim 1, wherein a shape of the projecting shape part of the heat receiving tubular portion in the orthogonal direction to the longitudinal direction of the container is an arcuate shape.

* * * * *